United States Patent [19]
Beyer et al.

[11] Patent Number: 6,095,749
[45] Date of Patent: Aug. 1, 2000

[54] HYDRAULIC TURBINE FOR ENHANCING THE LEVEL OF DISSOLVED GAS IN WATER

[75] Inventors: James R. Beyer, York; Richard K. Fisher, Jr., Jacobus; Robert G. Grubb, York, all of Pa.; Christian G. Cabou, Milwaukee, Mich.

[73] Assignee: Voith Hydro, Inc., York, Pa.

[21] Appl. No.: 09/312,539

[22] Filed: May 14, 1999

Related U.S. Application Data

[62] Division of application No. 08/733,366, Oct. 17, 1996, Pat. No. 5,924,842.

[51] Int. Cl.⁷ .................................................... F04D 29/38
[52] U.S. Cl. ............................................. 415/115; 261/93
[58] Field of Search .......................... 261/93; 415/115, 415/116

[56] References Cited

U.S. PATENT DOCUMENTS

| | | |
|---|---|---|
| 1,579,355 | 4/1926 | Greenawalt . |
| 1,925,777 | 9/1933 | Sperling . |
| 1,942,995 | 1/1934 | Biggs . |
| 2,668,079 | 2/1954 | Menegus et al. . |
| 2,772,863 | 12/1956 | Harney et al. . |
| 2,803,428 | 8/1957 | Garnett . |
| 2,914,301 | 11/1959 | Hess . |
| 3,108,146 | 10/1963 | Gross . |
| 3,123,651 | 3/1964 | Gross et al. . |
| 3,132,839 | 5/1964 | Haekal . |
| 3,305,215 | 2/1967 | Swiecicki et al. . |
| 3,663,117 | 5/1972 | Warren ..................................... 415/116 |
| 3,731,522 | 5/1973 | Mikesell ..................................... 261/93 |
| 3,862,747 | 1/1975 | Richter . |
| 4,169,047 | 9/1979 | Wilson . |
| 4,188,287 | 2/1980 | Faulkner et al. . |
| 4,371,480 | 2/1983 | Vos . |
| 4,479,757 | 10/1984 | Holmes et al. . |
| 4,780,051 | 10/1988 | Fisher, Jr. . |
| 5,035,579 | 7/1991 | Yada et al. . |
| 5,326,226 | 7/1994 | Wyczalkowski et al. . |
| 5,823,740 | 10/1998 | Cybularz et al. ........................ 415/115 |
| 5,879,130 | 3/1999 | Beyer et al. ............................. 415/115 |
| 5,924,842 | 7/1999 | Beyer et al. ............................. 415/115 |
| 5,924,844 | 7/1999 | Cybularz et al. ........................ 415/115 |
| 5,925,290 | 7/1999 | Hills ........................................... 261/93 |
| 5,941,682 | 8/1999 | Cybularz et al. ........................ 415/115 |

FOREIGN PATENT DOCUMENTS

| | | |
|---|---|---|
| 2071402 | 9/1971 | France . |
| 182600 | 7/1989 | Japan ..................................... 415/115 |
| 117479 | 10/1946 | Sweden ................................. 416/231 |
| 1052712 | 11/1983 | U.S.S.R. ................................. 415/115 |
| 760734 | 11/1956 | United Kingdom .................. 416/231 |

*Primary Examiner*—John Kwon
*Attorney, Agent, or Firm*—Foley & Lardner

[57] ABSTRACT

A turbine installation is adapted for enhancing the level of dissolved gas in water flowing therethrough. The installation comprises a water passageway for containing turbine components including a turbine runner. The water passageway extends from an upper elevation source of water to a lower elevation discharge region. The turbine runner is disposed in the passageway so that water flowing therethrough impinges on the runner. The runner includes a plurality of blades extending from the hub at circumferentially spaced intervals. Each blade is defined by a pressure surface, an oppositely facing suction surface, a leading edge and an spaced apart trailing edge. At least one of the blades has an integrally formed gas passage extending from a gas inlet aperture in the hub to the trailing edge. The installation further comprises an oxygen containing gas source coupled to the gas inlet aperture and a control system for controlling the flow of gas to the gas inlet aperture to regulate the dissolved oxygen level in the water. A method of increasing the dissolved oxygen level in such a turbine installation is also disclosed.

20 Claims, 13 Drawing Sheets

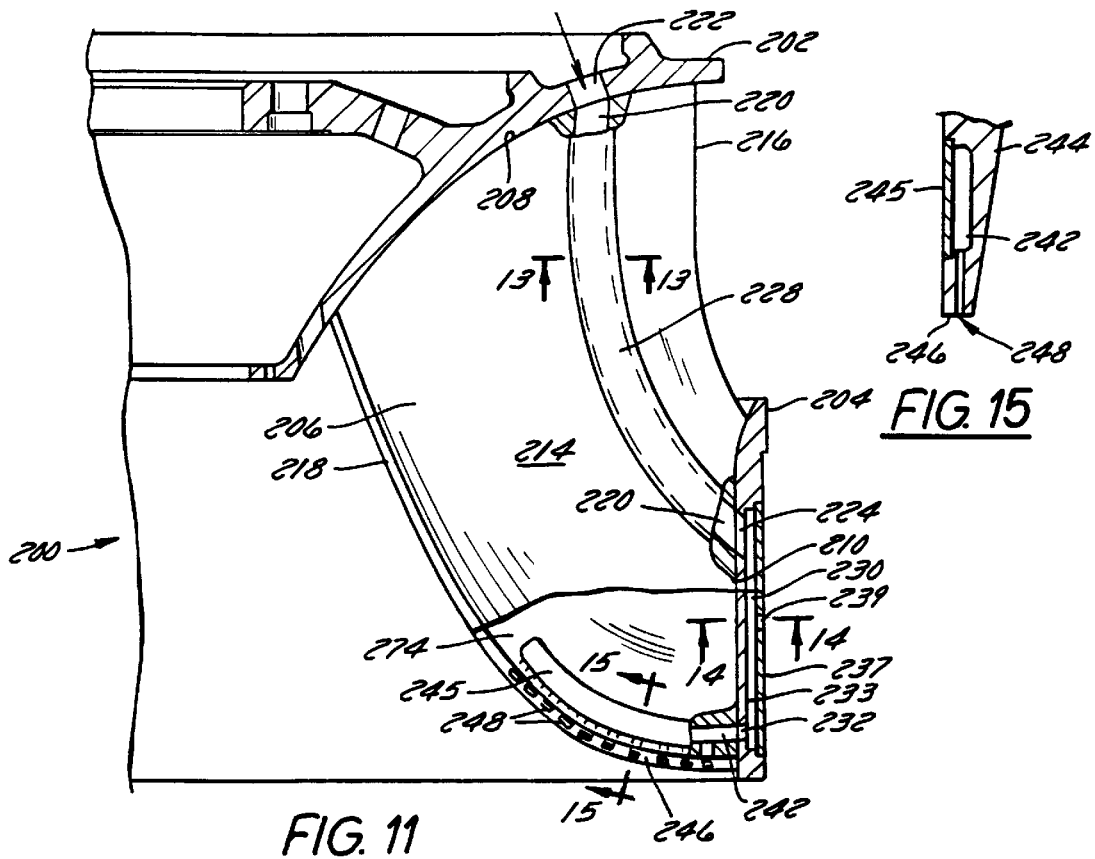
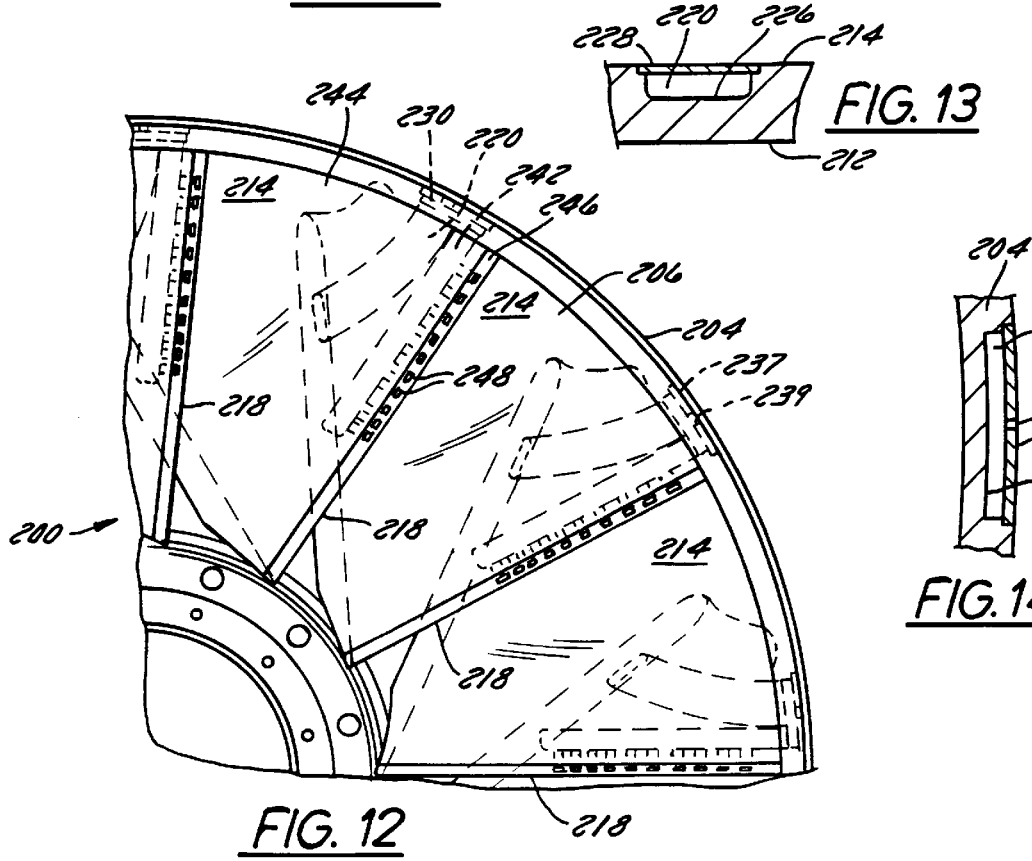
FIG. 11
FIG. 15
FIG. 13
FIG. 14
FIG. 12

HYDRAULIC TURBINE FOR ENHANCING THE LEVEL OF DISSOLVED GAS IN WATER

This application is a divisional of U.S. Ser. No. 08/733,366, filed Oct. 17, 1996, now U.S. Pat. No. 5,924,842.

FIELD OF THE INVENTION

The present invention relates generally to hydroelectric turbine installations. More particularly, this invention pertains to hydroelectric installations with means for enhancing the level of dissolved gas in water passing through the turbine.

BACKGROUND OF THE INVENTION

A significant environmental problem for many hydroelectric facilities is the water quality of turbine discharges. The primary water quality problem is often low dissolved oxygen (DO) levels which occur seasonally. During the summer months, thermal stratification of the reservoir produces a surface layer of less dense, warm water with relatively high dissolved oxygen and a lower, relatively cold oxygen-depleted layer resulting from the decay of organic material on the reservoir bottom. Hydraulic turbines draw their discharges from the lower level which can create water quality problems downstream of the facility.

Relicensing and rehabilitation of a hydroelectric facility offer an opportunity to address environmental and industrial development concerns over dissolved oxygen levels and other water quality regulations which affect hydropower releases. Rehabilitating an existing hydroelectric facility may include replacement of the runner. Replacing an existing runner with a new runner having integral passages, and providing air through existing structures or new structures of the installation to the integral passages, enhances dissolved oxygen levels in the water without material losses in efficiency or substantial increases in cost of rehabilitation.

Various attempts have been made to enhance the level of dissolved oxygen in water downstream of hydroelectric installations. For example, U.S. Pat. No. 4,789,051 to Fisher, Jr. discloses an apparatus comprising a manifold which contains a bounded air channel extending the length of the runner blade trailing edge. A plurality of holes are formed along the manifold extending between the channel and the turbine interior, the channel being in fluid communication with a source of oxygen. For the manifold to remain securely fastened over extended periods of operation, the trailing edge of the runner blade must be relatively thick, which may result in efficiency losses. Additionally, many installations have existing structures which make it impractical and thereby costly to provide air directly to the trailing edge of the runner blade.

Runner blade construction consists of either a solid casting or a fabrication. Most Francis runner blades built in the 70's and 80's were solid cast with extra material added in critical areas for final finishing. These castings were, and often still are, hand ground to templates and fixtures to meet the desired shapes. As machine tools have improved and the runner blade designs have become more computerized, critical areas and features of more complex geometries, such as integral passages, can nowadays be machined into the cast blades. However, this more modern machining approach has done little to improve the manufacturing cycle time, due to the long lead time associated with cast components, nor has it materially reduced manufacturing costs. Although fabricated blades offer improved cycle time and cost advantages, it has proven difficult in practice to fabricate blades having complex geometric features such as integral gas channels, particularly in the thinner portions of the blade.

The foregoing therefore indicates that prior art methods of feeding air directly to the trailing edge of the runner blade have not proved fully satisfactory in practice. Additionally, there is a need for a method of forming a runner blade having a gas channel of relatively complex geometry which offers improved cycle time and is less expensive than the prior art methods.

SUMMARY OF THE INVENTION

The present invention enhances the level of dissolved gas in water flowing through a hydraulic turbine installation. The installation comprises a water passageway for containing turbine components including a turbine runner. The water passageway extends from an upper elevation source of water to a lower elevation discharge region. The turbine runner is disposed in the passageway so that water flowing therethrough impinges on the runner. The runner includes a plurality of blades extending from the hub at circumferentially spaced intervals. Each blade is defined by a pressure surface, an oppositely facing suction surface, a leading edge and an spaced apart trailing edge. At least one of the blades has an integrally formed gas passage extending from a gas inlet aperture in the hub to the trailing edge. The installation further comprises an oxygen containing gas source coupled to the gas inlet aperture and a control system for controlling the flow of gas to the gas inlet aperture to regulate the dissolved oxygen level in the water.

In accordance with another aspect of the invention, the installation comprises a water passageway for containing turbine components including a turbine runner. The water passageway extends from an upper elevation source of water to a lower elevation discharge region. The turbine runner is disposed in the passageway so that water flowing therethrough impinges on the runner. The runner includes a crown, a band substantially concentric with the crown, and a plurality of blades extending between the crown and the band at spaced intervals along the crown. Each blade is defined by a pressure surface, an oppositely facing suction surface, a leading edge and an spaced apart trailing edge. At least one of the blades has an integrally formed gas passage extending from a gas inlet aperture in the crown to the trailing edge. The installation further comprises means for supplying an oxygen containing gas to the gas inlet aperture and a control system for controlling the gas supplying means to regulate the dissolved oxygen level in the water.

The present invention also includes a method of increasing the dissolved oxygen level in water passing through a turbine installation provided with features for enhancing dissolved oxygen levels. The method comprises the steps of supplying a flow of oxygen containing gas to the gas inlet aperture, sensing a level of dissolved oxygen in the water flowing through the water passageway, and regulating the flow of oxygen containing gas based on the sensed dissolved oxygen levels to regulate the dissolved oxygen level in the water.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 11 is an elevation view, partially in cross section, of an alternative embodiment of a runner of the present invention showing a portion of the crown, the band and two adjacent blades;

FIG. 12 is a bottom plan view of the runner of FIG. 11.

FIG. 13 is an enlarged cross-sectional view of a gas admission passage in one of the blades of FIG. 11 taken along line 13—13 shown in FIG. 11;

FIG. 14 is an enlarged cross-sectional view of an interconnecting passage in the band of FIG. 11 taken along line 14—14 shown in FIG. 11;

FIG. 15 is an enlarged cross-sectional view of a gas admission passage in the other of the blades of FIG. 11 taken along line 15—15 shown in FIG. 11;

DETAILED DESCRIPTION OF A PREFERRED EXEMPLARY EMBODIMENT

The present invention relates generally to hydroelectric installations having turbines provided with features designed to enhance the level of dissolved gas, such as oxygen, in water flowing through the turbines.

Figure 1:
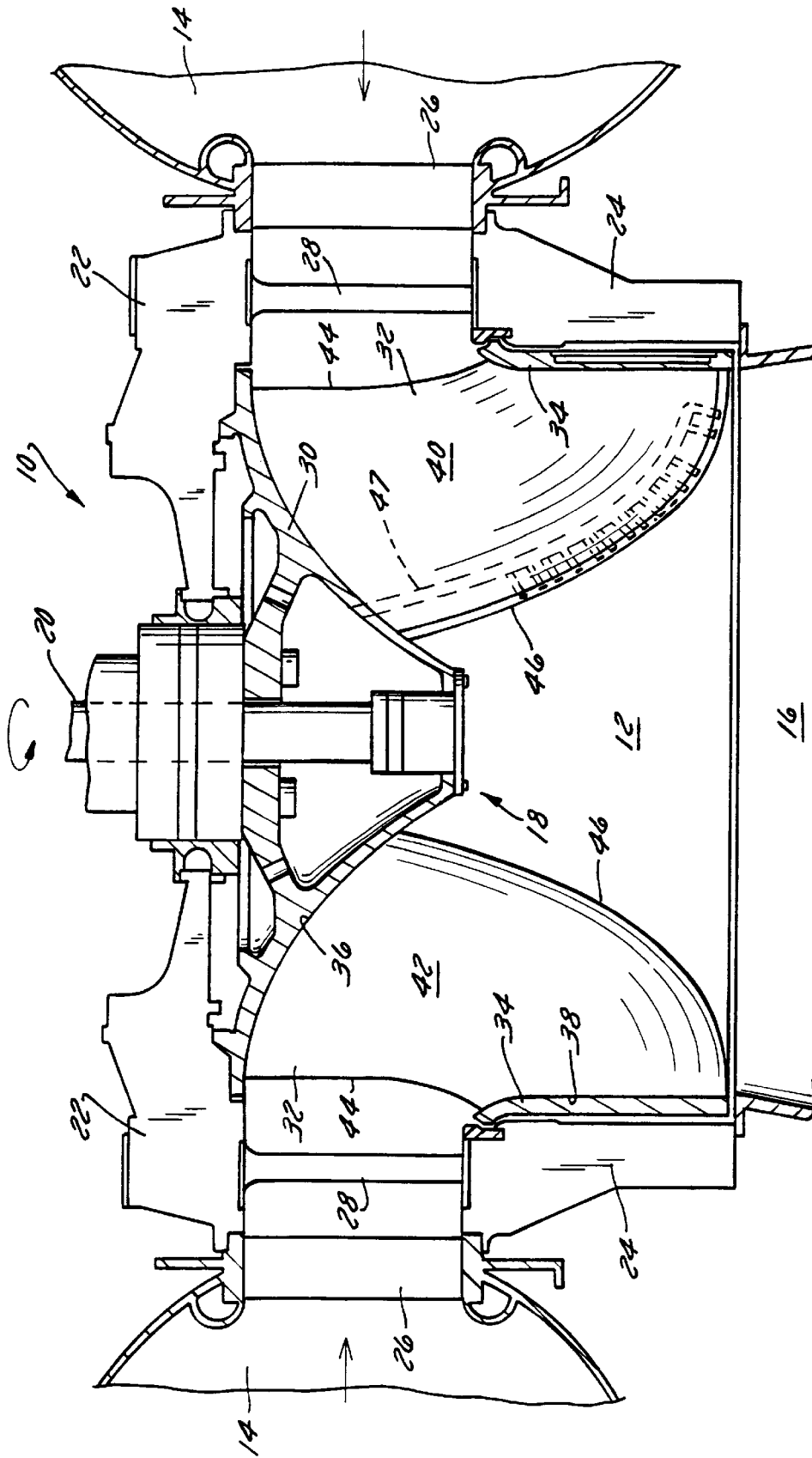
FIG. 1 is an elevational view, partially in cross section, of a Francis turbine including a first embodiment of a runner of the present invention.
Figure 2:
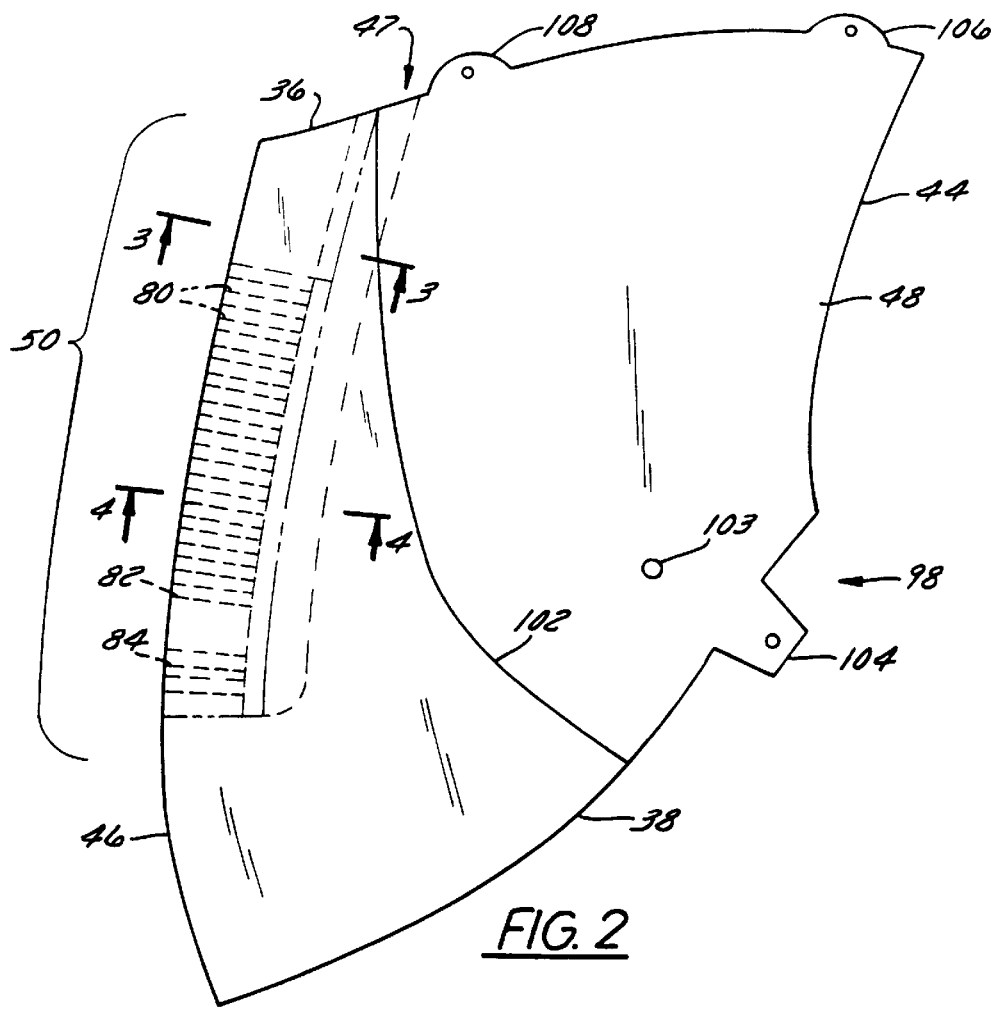
FIG. 2 is a top plan view of one associated blade from the runner of FIG. 1, the blade being shown in a partially manufactured condition.

Referring to FIG. 1, a portion of a hydroelectric turbine installation generally designated as 10 comprises a passageway 12, in which water flows from a source 14 in fluid communication with the upstream end of installation 10, to a lower elevation discharge region 16. As illustrated, installation 10 is a Francis turbine having a runner 18 secured to a shaft 20 supported for rotation therewith, a stationary head cover 22, a bottom discharge ring 24, and a plurality of stationary stay vanes 26. Installation 10 also includes a plurality of pivotally adjustable wicket gates 28 to regulate the flow of water impinging on turbine runner 18.

Turbine runner 18 includes a crown 30 secured to the lower end of shaft 20 and a plurality of circumferentially spaced runner blades 32 extending from crown 30 and terminating at an enclosing band 34 substantially concentric with crown 30. Each blade 32 is fixedly secured to crown 30 along an inner edge 36 of blade 32, and to band 34 along a distal outer edge 38. Each blade 32 has a water directing surface defined by a pressure side 40, an oppositely facing suction side 42, a leading edge 44 and a spaced apart trailing edge 46. At least one blade 32 includes an integrally formed gas passage 47 extending from inner edge 36 to trailing edge 46.

Figure 3:
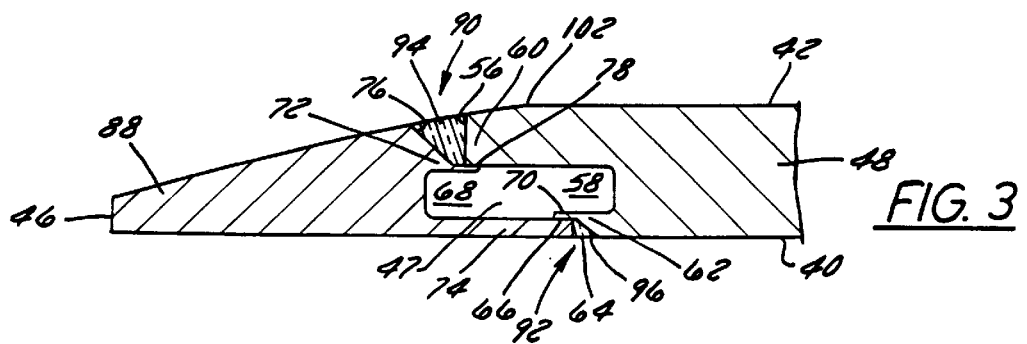
FIG. 3 is a cross-sectional view of a portion of the blade of FIG. 2 taken along line 3—3 shown in FIG. 2.
Figure 4:
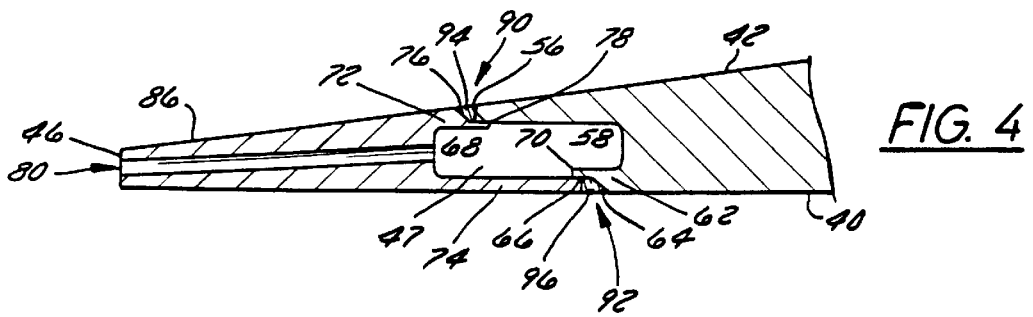
FIG. 4 is a cross-sectional view of a portion of the blade of FIG. 2 taken along line 4—4 shown in FIG. 2.
Figure 5:
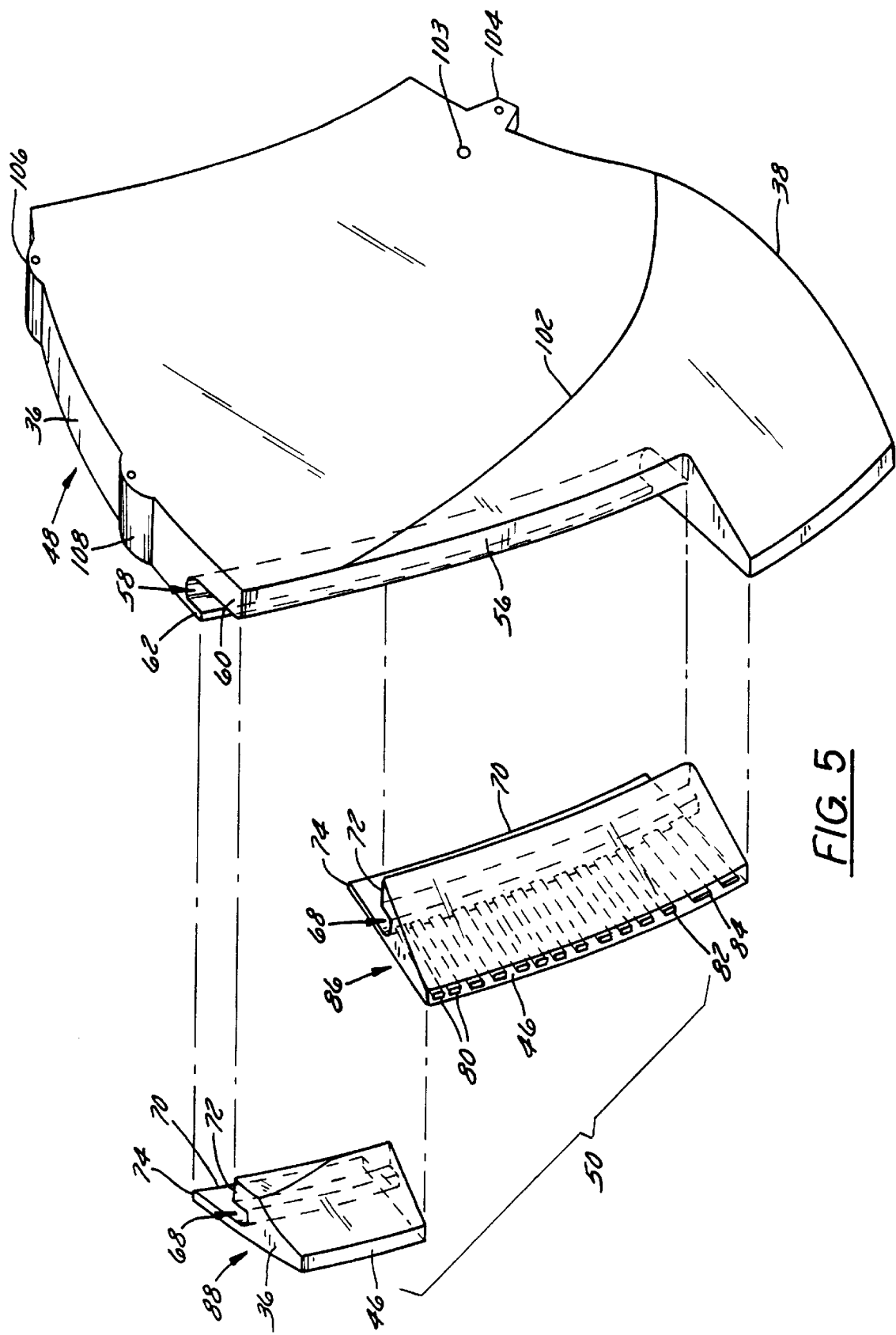
FIG. 5 is an exploded perspective view of the blade of FIG. 2.
Figure 8:
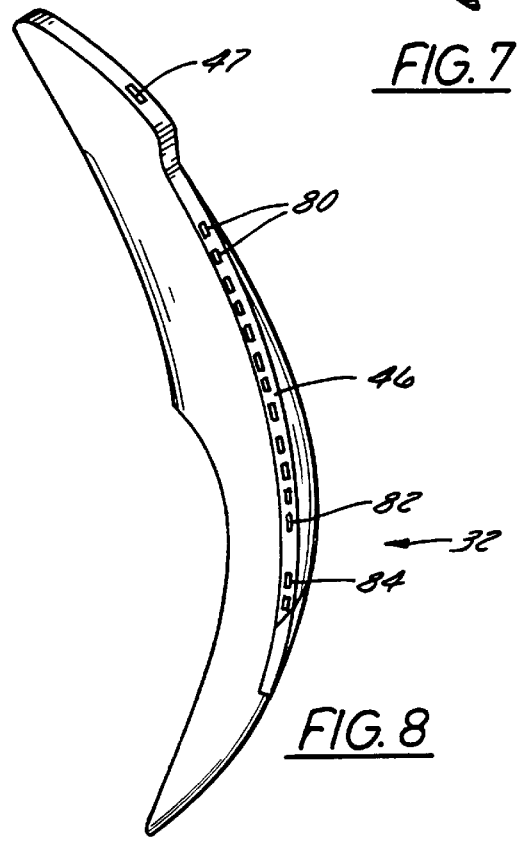
FIG. 8 is a left side view of the blade shown in FIG. 6.
Figure 9:
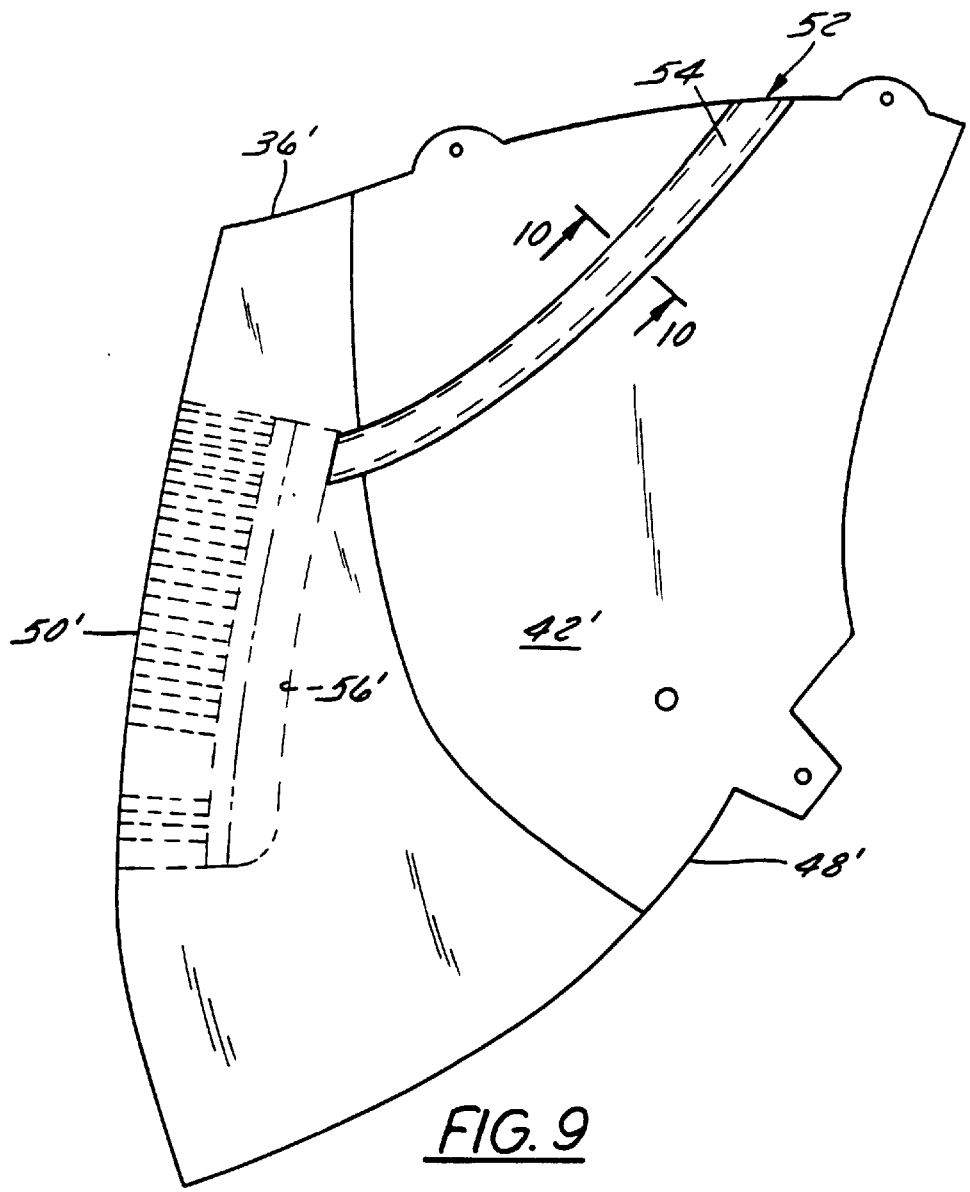
FIG. 9 is a top plan view of an alternative embodiment of the blade for the runner of FIG. 1, the blade being shown in a partially manufactured condition.
Figure 10:
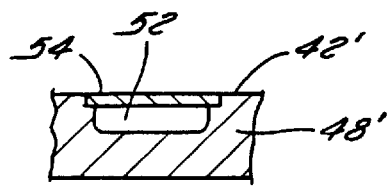
FIG. 10 is a cross-sectional view of a gas passage in the blade of FIG. 9 taken along line 10—10 shown in FIG. 9.

Turning now to FIGS. 2–8, the method of forming blade 32 (see FIGS. 6–8) associated with runner 18 will be described. Initially, a blank is cut from mill plate to the overall blade profile by a suitable method (e.g., by plasma arc). Mill plate preferably comprises stainless steel plate such as ASTM A240 Type 304L or ASTM A240 Type S41500. As best shown in FIG. 5, the blank is cut into a leading blade portion or member 48 and a trailing blade portion or insert 50. Insert 50 preferably includes a region of inner edge 36 of blade 32. However, an alternative embodiment is illustrated in FIGS. 9 and 10 in which an insert 50' is spaced from an inner edge 36', and a shallow groove 52 and an overlying cover plate 54 extend from inner edge 36' to a rear edge 56' of a member 48'. Cover plate 54 is welded within an upper area of shallow groove 52 and is generally flush with a suction side 42' of the blade.

Returning now to FIGS. 3–5, a rearwardly opening slot or groove 58 is machined along a length of a rear or trailing edge 56 of member 48, leaving an upper shoulder 60 and a lower shoulder 62. Lower shoulder 62 is machined to include a bevelled surface 64 extending from pressure side 40 (i.e., the lower surface as illustrated in FIGS. 3 and 4) to a rearwardly projecting lip 66. A frontwardly opening slot or groove 68 is machined along a front or leading edge 70 of insert 50, leaving an upper shoulder 72 and a lower shoulder 74. Upper shoulder 72 is machined to include a bevelled surface 76 extending from suction side 42 (i.e., the upper surface as illustrated in FIGS. 3 and 4) to a frontwardly projecting lip 78.

A plurality of discharge passages 80 are formed in insert 50 (e.g., by drilling) extending from groove 68 to trailing edge 46. Discharge passages 80 are generally provided at regularly spaced intervals, however, an extra wide interval may be provided between adjacent passages (such as between passages 82 and 84) to reinforce an area of insert 50 subject to particular pressure during the pressing operation described below. Discharge passages 80 may be provided with any desired cross-sectional shape such as by use of an Electrostatic Discharge Machine (EDM). As shown in FIG. 5, insert 50 may be divided into segments 86 and 88 so that segment 86 having discharge passages 80 is small enough to fit into the equipment used to form passages 80. In the illustrated embodiment, a total of fourteen rectangular slots 80 have been provided.

Insert 50 and member 48 are then preferably aligned in a clamping fixture (not shown). More specifically, insert 50 is aligned with member 48 such that lip 78 of insert 50 projects a short distance forwardly into groove 58 and abuts against upper shoulder 60 (see FIGS. 3 and 4). Similarly, lip 66 of member 48 projects a short distance rearwardly into groove 68 and abuts against lower shoulder 74. Thus, bevelled surface 76 and rear edge 56 form a generally V-shaped, upwardly opening channel 90, and bevelled surface 64 and front edge 70 form a generally V-shaped, downwardly opening channel 92. Upwardly opening channel 90 and downwardly opening channel 92 are then filled by weld build-up to form a suction side weld-joint 94 and a pressure side weld-joint 96, respectively, which fixedly secure member 48 and insert 50 together to form a flat plate weldment 98 (see FIG. 2). Suction side weld-joint 94 is preferably offset from pressure side weld-joint 96, thereby facilitating the forming of grooves 58 and 68 along the pressure and suction sides 40 and 42, respectively, rather than confining grooves 58 and 68 solely to the relatively narrow edges 56 and 70, respectively. In addition to providing this manufacturing advantage, the offset weld-joints are believed to increase the durability of such a structure over those having adjacent weld-joints. As shown in FIGS. 3 and 4, rearwardly opening groove 58 and frontwardly opening groove 68 thus cooperate to form an integral aeration conduit or passage 47 through which an oxygen containing gas, such as air, can be transported.

Returning to FIG. 2, flat plate weldment 98 is then machined (e.g., by face milling on a CNC horizontal boring mill) to establish a thickness distribution from trailing edge 46 forward to a line of maximum thickness 102. Following this thinning operation, the machined area is ground to remove all ridges and prepared for forming. Flat plate weldment 98 is then preferably uniformly heated between 1850° F. and 1945° F. and pressed between male and female former halves in a hydraulic press (not shown) to the final shape of a hydrofoil having a water directing surface. Of course, the pressing operation could also be done without heating plate 98 depending on the composition, sizes and shapes of the materials being formed. During the pressing operation, close attention is taken to controlling blade position in the former to insure correct contour. An important part of the process is thus the establishment of control points 103 and 104 that are used to position the thinned blade for forming and for final machining. In the illustrated embodiment, control point 103 is a hole and control point 104 is a generally rectangular tab projecting outwardly from outer edge 38. The forming press (not shown) is, of course, provided with a complementary pin and slot arrangement to engage control points 103 and 104, respectively. While lifting tabs 106 and 108 are conveniently provided on blade 32 to assist the handling, they may also be used as control points. Accordingly, those skilled in the art will readily appreciate that a variety of combinations of control points 103, 104 may be used depending on the particular manufacturing constraints. Blade 32 is then cooled in the former under pressure to assure consistency and may subsequently be tempered to impart toughness and ductility, as required by the material of choice.

Figures 6, 7:
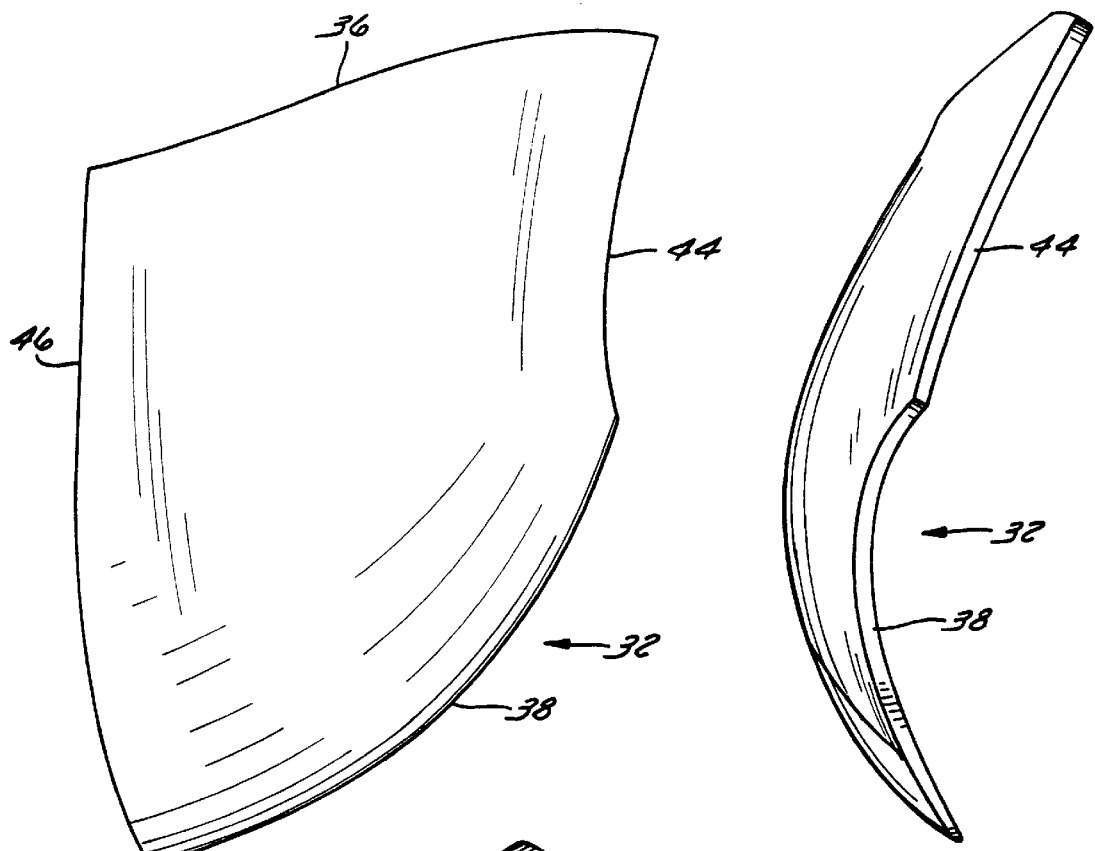
FIG. 6 is a top plan view of the blade of FIG. 2, the blade being shown in a finished manufactured condition.
FIG. 7 is a right side view of the blade shown in FIG. 6.

Following the pressing operation, blade 32 is cleaned by sand blasting and the final shape is verified using a measuring device such as a laser tracker. Blade 32 is fixtured for machining using control points 103 and 104 established for forming. Leading edge 44 and trailing edge 46, along with inner edge 36 and outer edge 38, are then CNC machined to final shape and position. Afterward, control points 103 and 104 are removed by filling the hole and removing the tab, respectively, and blade 32 is ground to meet profile, finish and fairness requirements. FIGS. 6–8 illustrate blade 32 in a finished condition ready for assembly with crown 30 and band 34.

Turning now to FIGS. 11–15, a portion of another embodiment of a runner 200 for a Francis turbine is illustrated. Runner 200 includes a crown 202, a band 204 substantially concentric with crown 202, and a plurality of circumferentially spaced blades 206 extending between crown 202 and band 204. Each blade 206 is fixedly secured to crown 202 at an inner edge 208 and to band 204 at a distal outer edge 210. Each blade 206 has a water directing surface defined by a pressure side 212, an oppositely facing suction side 214, a leading edge 216 and a spaced apart trailing edge 218. At least one blade 206 further includes a gas admission passage 220 extending from a gas admission aperture 222 formed in crown 202 to a gas admission aperture 224 formed in band 204. Gas admission passage 220 comprises a shallow groove 226 integrally formed on suction side 214 of blade 206. Alternatively, the gas admission passage could be formed on the pressure side of blade 206 instead of on the suction side. A cover plate 228 is secured over shallow groove 226 to complete gas admission passage 220. Although not illustrated, cover plate 228 could also include a plurality of gas discharge apertures extending from gas admission passage 220 to suction side 214.

As illustrated in FIGS. 11 and 12, band 204 includes an interconnecting passage 230 leading from gas admission aperture 224 to a gas admission aperture 232 adjacent a bottom region of band 204. Interconnecting passage 230 comprises a shallow groove 233 in band 204 and a cover plate 237 secured over groove 233. Cover plate 237 may include a gas discharge aperture 239 extending therethrough (see FIG. 14) for permitting gas into the gap between band 204 and a surrounding discharge ring (not shown).

A gas admission passage 242 is formed in a blade 244 adjacent to blade 206 for discharging gas from interconnecting passage 230 in band 204. Gas admission passage 242 in blade 244 is covered by a plate 245 and extends from gas admission aperture 232 in band 204 along a trailing edge 246 of blade 244 toward crown 202. A plurality of discharge apertures 248 extend from gas admission passage 242 to trailing edge 246 for allowing discharge of the oxygen containing gas from band 204. Although not shown, an alternative to gas admission passage 242 and discharge apertures 248 is that a discharge opening could be provided in the lower region of band 204.

Figure 16:
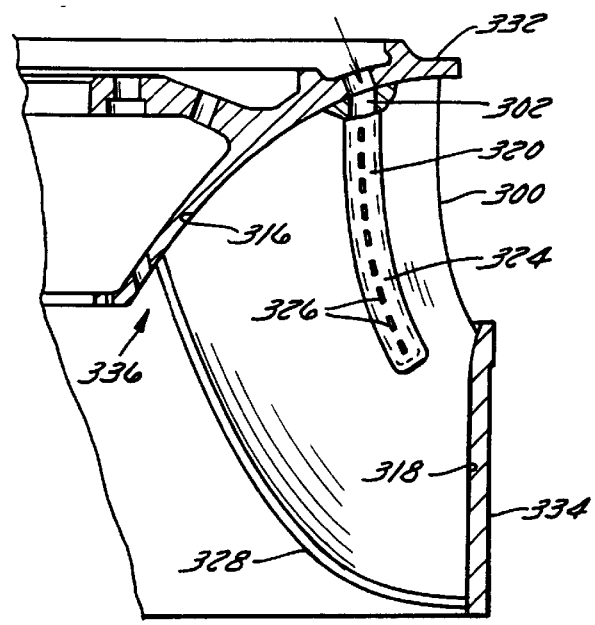
FIG. 16 is an elevation view, partially in cross section, of another alternative embodiment of a runner of the present invention showing a portion of the crown, the band and the blade.
Figure 17:
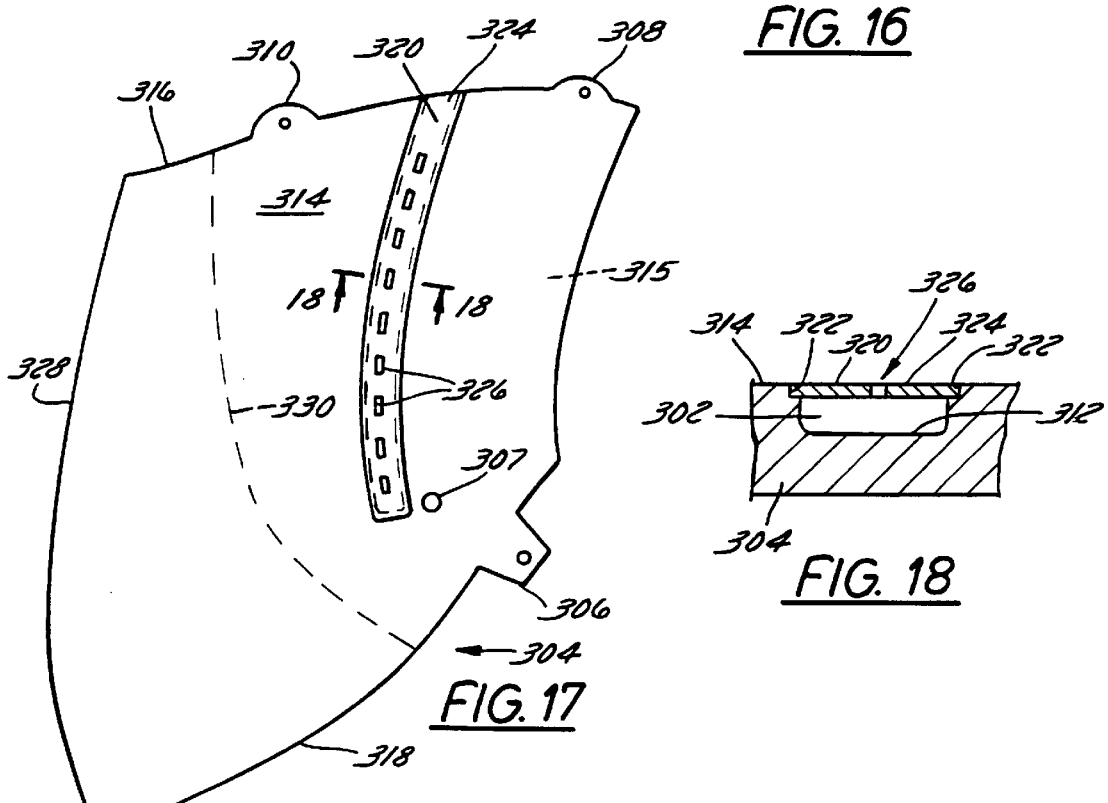
FIG. 17 is a top plan view of one associated blade from the runner of FIG. 16, the blade being shown in a partially manufactured condition.
Figure 18:
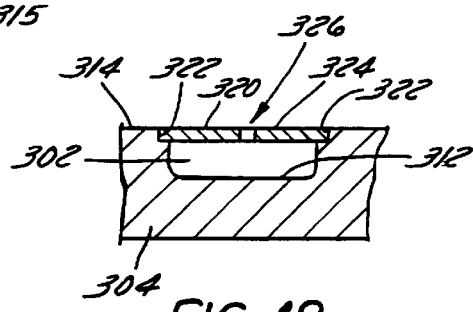
FIG. 18 is an enlarged cross-sectional view of a gas passage in the blade of FIG. 17 taken along line 18—18 shown in FIG. 17.

Turning now to FIGS. 16–18, another method of forming a blade 300 having an integral gas passage 302 will be described. Initially, a substantially planar blank is machined from mill or cast plate to provide an unformed blade 304 having an overall blade profile including control points 306, 307 similar to those described above and optional lifting tabs 308, 310. A shallow groove 312 is formed on a suction surface 314 of unformed blade 304 extending from a region along an inner edge 316 toward a distal out edge 318. A relatively thin cover plate 320 is fixedly secured to blade 300 to form gas passage 302 by welding a perimeter of cover plate 320 to an upper step 322 (see FIG. 18). Upper step 322 surrounds shallow groove 312 and is of sufficient depth such that a top surface 324 of cover plate 320 is about flush with suction surface 314 after securing cover plate 320 to step 322. A plurality of apertures 326 are formed in cover plate 320 extending from shallow groove 312 to suction surface 314 to allow for gas discharge. Alternatively, shallow groove 312 covered by cover plate 320 could be formed on the pressure side 315 of blade 304. In that case, apertures 326 would extend from passage 302 to suction side 314.

The side of blade 304 opposite that to which cover plate 320 is attached is then machined to establish a thickness distribution increasing from a trailing edge 328 forward to a line of maximum thickness 330, and then formed and finished in a manner similar to that described above with respect to blade 32. During the finishing operation, control points 306, 307 and lifting tabs 308, 310 are removed. Blade 300 is then ready for assembly to a crown 332 and a band 334 during formation of a runner 336.

Figure 18A:
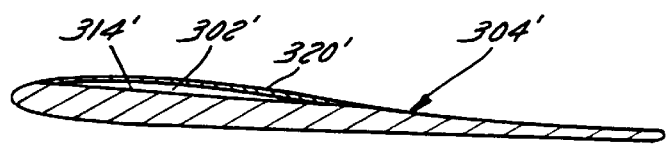
FIG. 18A is cross-sectional view of an alternative gas passage in a blade being shown in a partially manufactured condition.

FIG. 18A illustrates an alternative arrangement for forming a gas passage 302' on a partially formed blade 304'. Specifically, a perimeter of a relatively thin cover plate 320' is welded to a surface 314' of the blank so that cover plate 320' is concave relative to the blank, thus forming gas passage 302' therewith. With this arrangement, it is unnecessary to form the shallow groove beneath cover plate 320' to form the gas passage. In such case, blade 304' could be machined and pressed or could be cast. Cover plate 320' could be pressed also. In the event blade 304' and plate 320' are made of a material other than metal, different modes of attachment compatible with such material could also be used.

Figure 19:
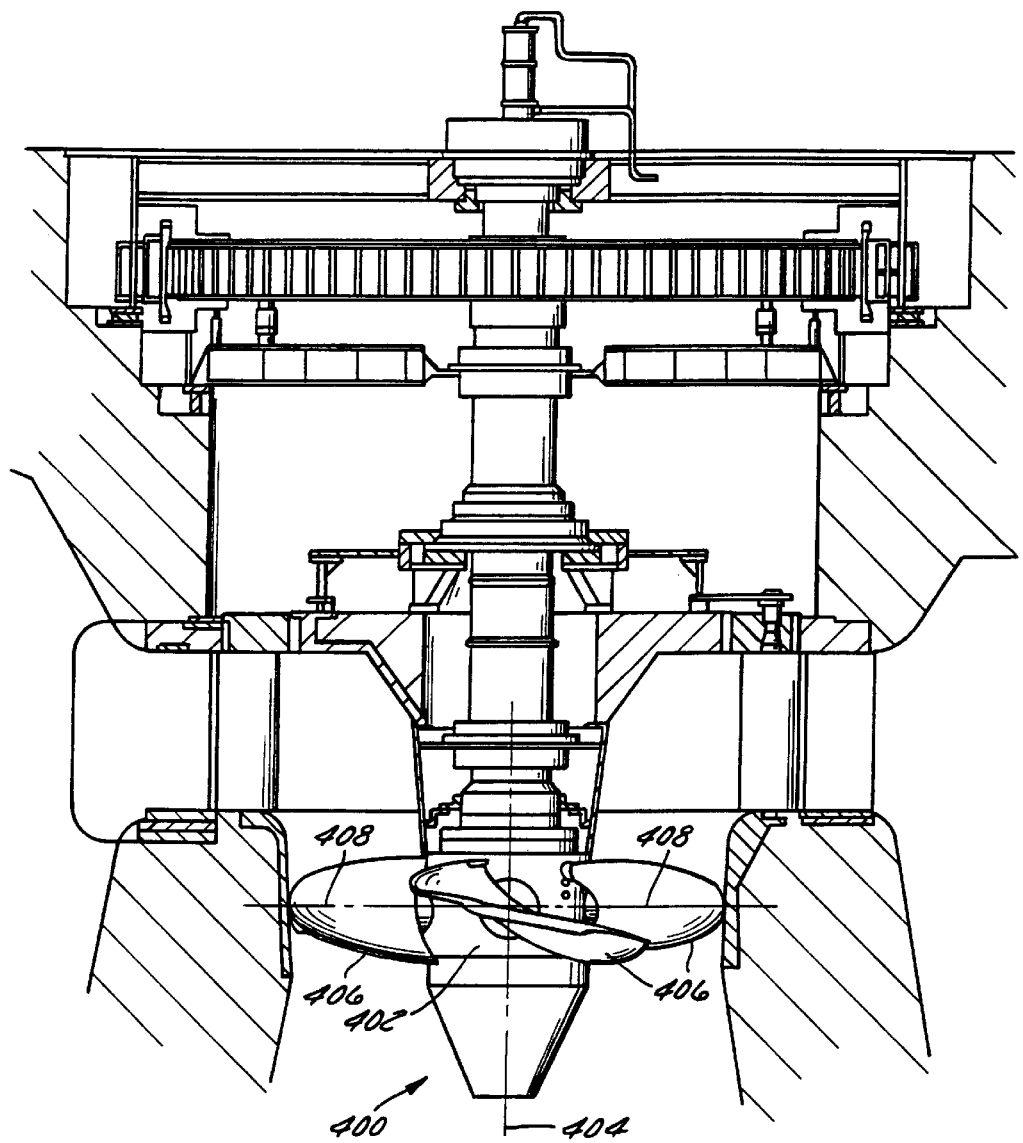
FIG. 19 is an elevational view, partially in cross section, of a Kaplan turbine in accordance with another embodiment of the present invention, showing a runner with adjustable blades.

Turning now to FIG. 19, a Kaplan turbine is shown generally as 400 comprising a hub 402 having a longitudinal axis 404 and a plurality of circumferentially spaced variable pitch blades 406 projecting generally radially outwardly from hub 402. Each blade 406 is pivotally connected to hub 402 about a rotational axis 408 extending in a direction generally perpendicular to longitudinal axis 404.

Figure 20:
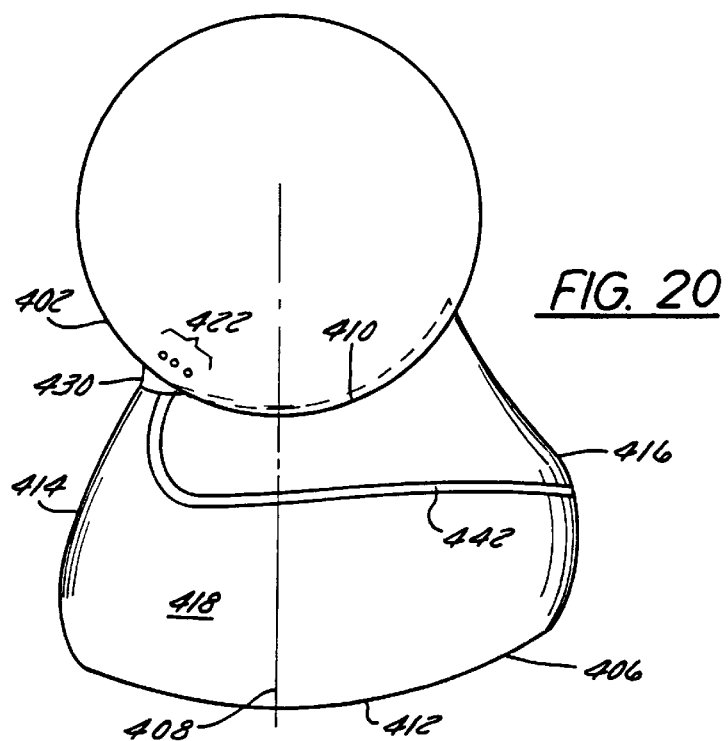
FIG. 20 is a top plan view of the hub and one associated blade of the runner of FIG. 19, showing a boot fitted onto a portion of the inner edge of the blade.
Figure 21:
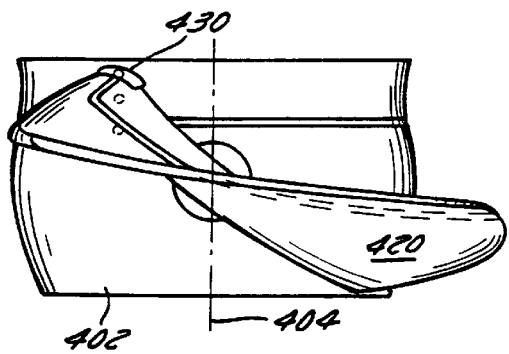
FIG. 21 is an elevational view of the hub, blade and boot shown in FIG. 20.
Figure 22:
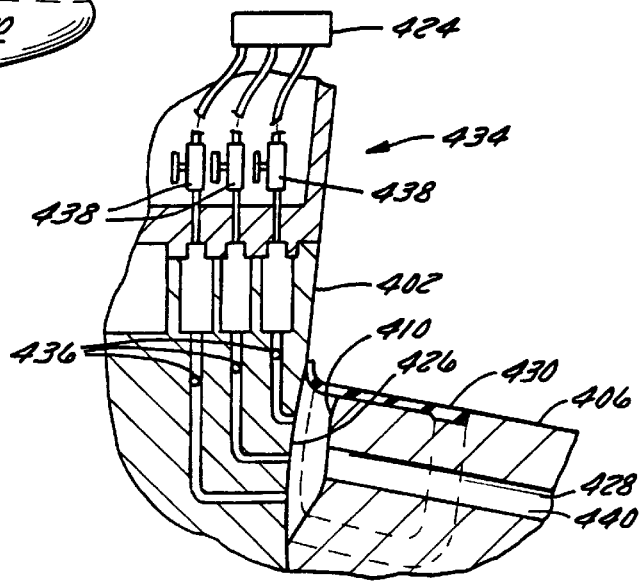
FIG. 22 is an enlarged partial sectional view showing the air passages, associated valves and governors used with the hub, blade and boot shown in FIG. 20.

Referring now more particularly to FIGS. 20–22, hub 402 will be further described with only one associated blade 406, but it will be understood the following description applies in similar manner to any number of the remaining blades. Blade 406 is bounded by an inner edge 410, a distal outer edge 412, a leading edge 414 and an opposed trailing edge 416 separated by a water directing surface 418 and an opposed suction surface 420. Blade 406 is rotatable from a maximum pitch position, in which water directing surface 418 extends in the general direction of axis 404, to a minimum pitch position, in which water directing surface 418 is substantially perpendicular to longitudinal axis 404. Hub 402 includes a group of gas passages 422 (see FIG. 20) extending from a gas source 424 (see FIG. 22) to an exterior surface region 426 of hub 402 associated with blade 406. Blade 406 has a gas admission passage 428 extending from inner edge 410 to trailing edge 416. Alternatively, gas admission passage 428 could extend to outer edge 412 of blade 406.

A flexible boot 430 is secured to blade 406 such that it is effectively in contact with exterior surface region 426. Boot 430 therefore seals off the cavity formed between inner edge 410 and surface region 426. Flexible boot 430 is made of a molded elastomeric material. In cases where the gap between hub 402 and inner edge 410 is merely a clearance gap (such as for example when hub 402 is fully spherical), boot 430 could simply be configured as a clearance seal.

As shown in FIG. 22, a control system shown generally as 434 selectively puts gas admission passage 428 into fluid communication with one or more selected gas passages of the group of gas passages 422 based on the pitch of blade 406. Control system 434 includes a separate check valve 436 for each gas passage and an associated actuator 438 which controls which valve(s) 436 admits gas into passage 428. Gas admission passage 428 in blade 406 comprises a channel 440 formed in water directing surface 418 and a cover plate 442 secured over channel 440. Gas passage 428 could be formed integrally as explained above.

Figure 23:
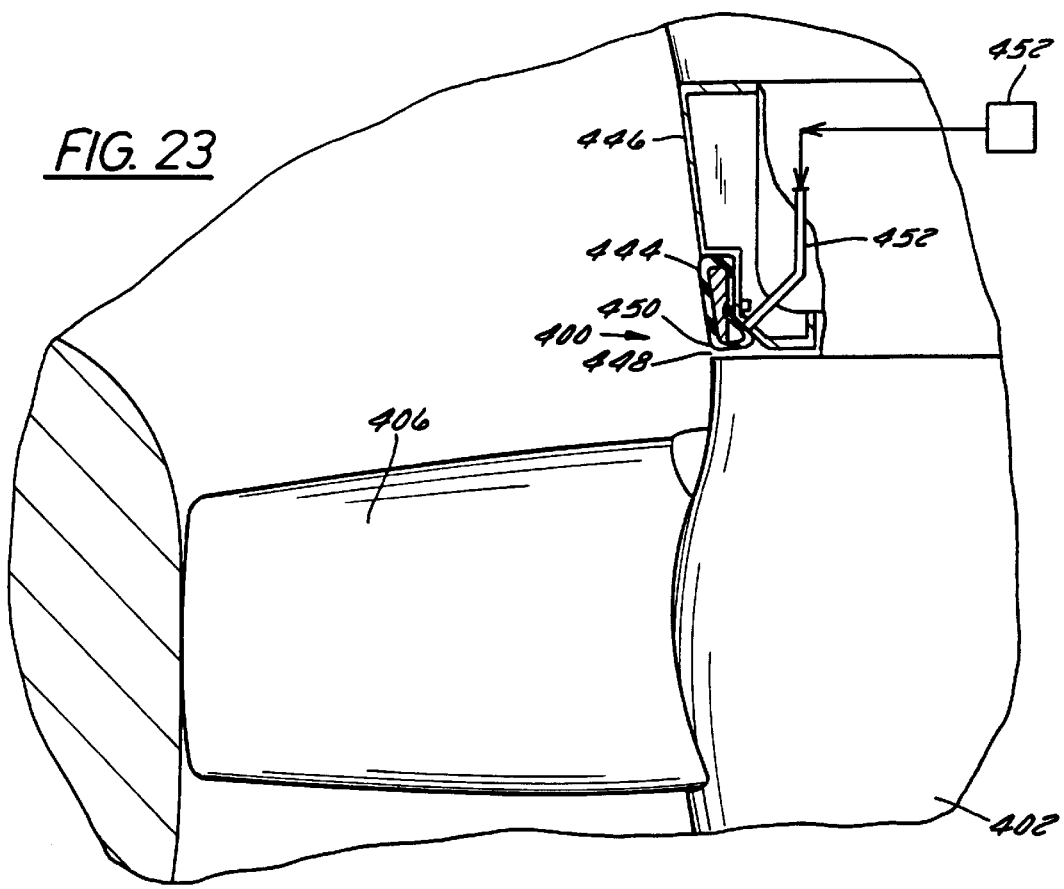
FIG. 23 is an elevational view, partially in cross section, of another embodiment of the present invention showing an inflatable shroud in deflated condition and a gas discharge opening adjacent the shroud.
Figure 24:
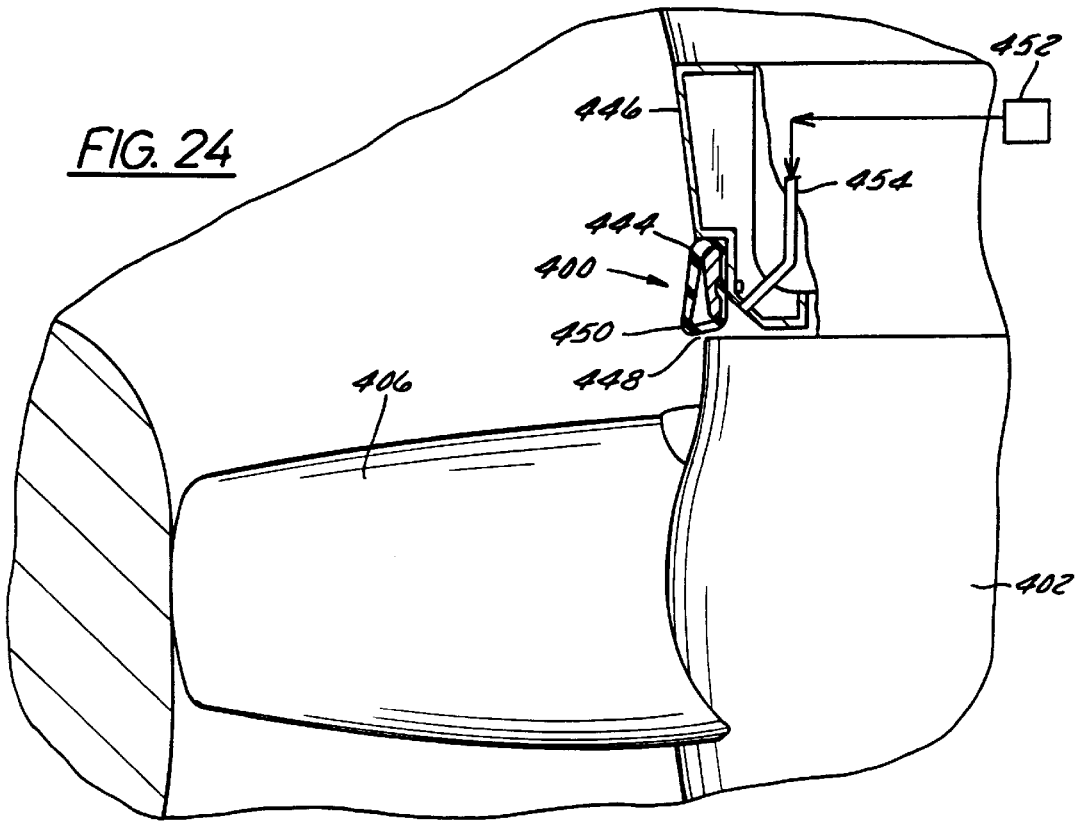
FIG. 24 is an elevational view, partially in cross section, of the embodiment of FIG. 23 showing the inflatable shroud in inflated condition and the gas discharge opening adjacent the shroud.

Turning now to FIGS. 23 and 24, a portion of turbine 400 of FIG. 19 is shown including hub 402 and blade 406. An inflatable shroud 444 is connected to a head cover 446 disposed upstream of hub 402, and a gas discharge opening 448 is positioned adjacent a downstream edge 450 of shroud 444. Shroud 444 may comprise a continuous inflatable belt surrounding the entire perimeter of head cover 446, or alternatively a plurality of shrouds 444 may be disposed and attached at discrete locations around the perimeter of head cover 446. Shroud(s) 444 is (are) inflated as required depending on the level of dissolved oxygen in the water passing through the turbine, thereby creating a low pressure region proximate opening 448 to facilitate the exhaust of gas therefrom. A compressor 452 may be used to force gas through a gas passage 454 leading to shroud(s) 444 and discharge opening 448 to increase dissolved oxygen level in the water.

Figure 25:
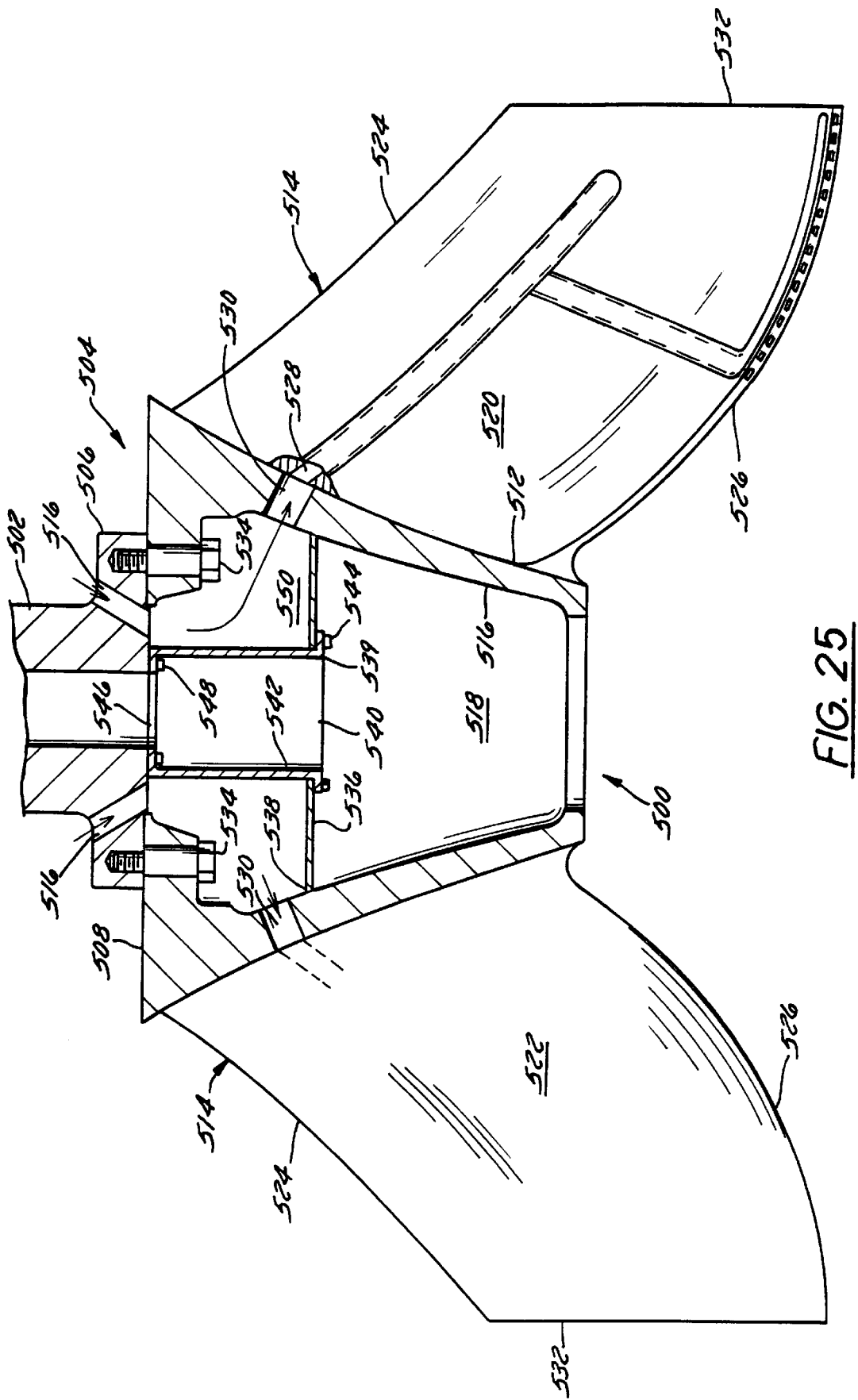
FIG. 25 is an elevational view, partially in cross section, of a bandless turbine including another embodiment of a runner of the present invention.

Referring to FIG. 25, a portion of a bandless turbine is shown generally as 500 having a shaft 502 and a runner 504 secured to a lower end 506 of shaft 502 for rotation therewith. Runner 504 includes a hollow hub 508 having spaced apart inner and outer surfaces 510 and 512, respectively, and a plurality of circumferentially spaced, generally radially extending blades 514. Shaft 502 has a plurality of openings 516 extending therethrough to an interior 518 of hollow hub 508.

Each blade 514 is defined by a pressure surface 520, an oppositely facing suction surface 522, a leading edge 524 and a spaced apart trailing edge 526. Each blade 514 further includes a passage 528 extending from a gas admission aperture 530 in inner surface 510 of hub 508 to trailing edge 526 of blade 514. Passage 528 in blade 514 extends along a portion of trailing edge 526 to an outer edge 532.

Runner 504 is releasably secured to shaft 502 (e.g., by bolts 534) to position runner 504 in the water passageway. Interior 518 includes a horizontally disposed annular plate 536 having an outer edge 538 welded to inner surface 510 of hollow hub 508 at a region below gas admission aperture 530. A lower end 539 of a cylindrical member 540 is releasably secured to an inner edge 542 of annular plate 536 (e.g., by bolts 544), and an upper end 546 of member 540 is releasably secured to lower end 506 of shaft 502 (e.g., by bolts 548), thus forming an annular upper chamber 550. Chamber 550 thus fluidly couples openings 516 in shaft 502 to gas admission apertures 530 in hollow hub 508, which apertures 530 in turn are fluidly coupled with passages 528 in blades 514. An oxygen containing gas is supplied to openings 516 in shaft 502 during operation of turbine 500 to enhance dissolved oxygen level in water passing through turbine 500.

Figure 26:
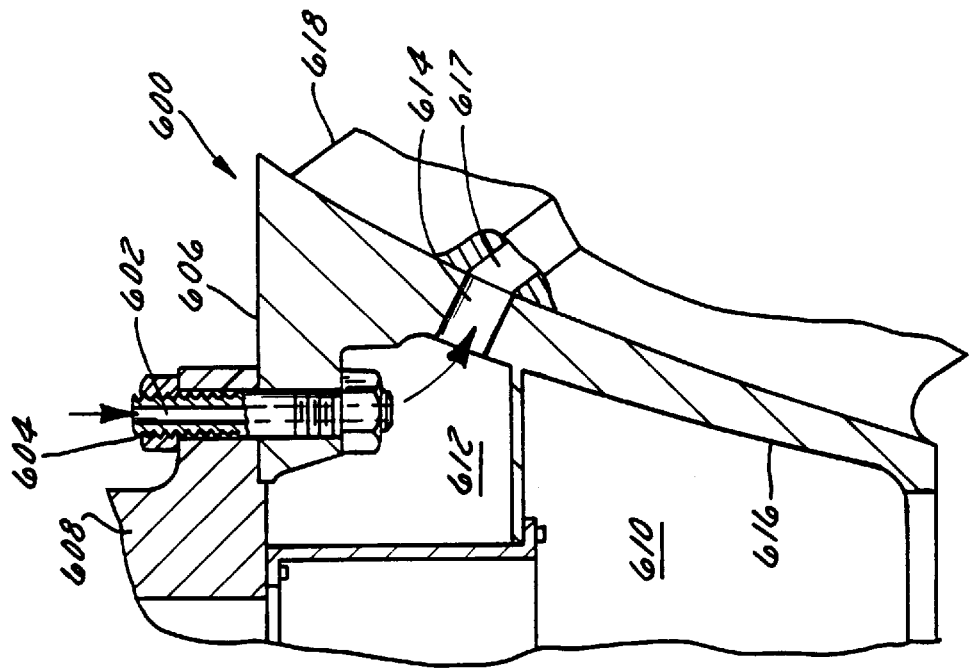
FIG. 26 is an elevation view, partially in cross section, of a bandless turbine including another embodiment of a runner of the present.

FIG. 26 shows an alternative arrangement for providing gas to a runner 600 of a bandless turbine. Specifically, gas is provided through an opening 602 in one or more hollow bolt(s) 604 used for coupling a hollow hub 606 of runner 600 to a shaft 608. Thus, an advantage of this is there is no need to form a separate opening in shaft 608. The structure of runner 600 is otherwise similar to that described above with respect to runner 504 of FIG. 25. That is, an interior 610 of hub 606 is provided with an upper chamber 612 for fluidly coupling opening 602 to a gas admission aperture 614 in an inner surface 616 of hub 606, which aperture 614 is in turn fluidly coupled with a passage 617 in a runner blade 618 leading to a trailing or outer edge thereof.

Figure 27:
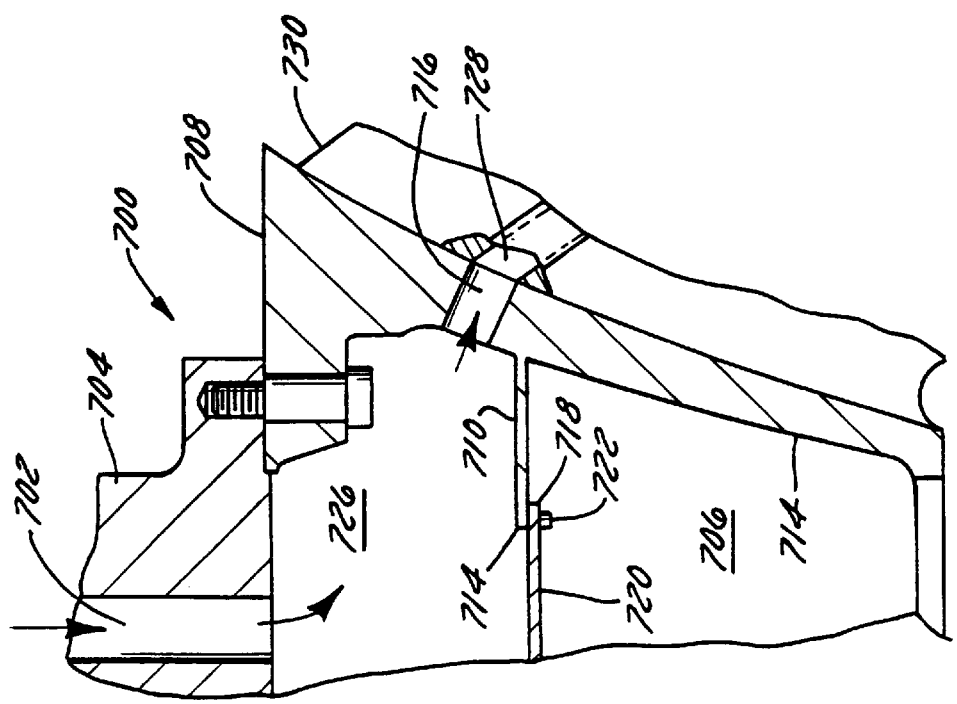
FIG. 27 is an elevation view, partially in cross section, of a bandless turbine including another embodiment of a runner of the present invention.

FIG. 27 shows another alternative arrangement for providing gas to a runner 700 in a bandless turbine. Specifically, gas is provided through a central opening 702 in a shaft 704 to an interior 706 of a hollow hub 708. Interior 706 includes a horizontally disposed annular plate 710 having an outer edge 712 welded to an inner surface 714 of hollow hub 708 at a region below a gas admission aperture 716 in inner surface 714. An outer edge 718 of a circular plate 720 is releasibly secured (e.g., by bolts 722) to an inner edge 724 of annular plate 710 to form an upper chamber 726 which fluidly couples opening 702 to gas admission aperture 716. Aperture 716 is in turn fluidly coupled with a passage 728 in a blade 730 leading to a trailing or outer edge thereof.

Figure 28:
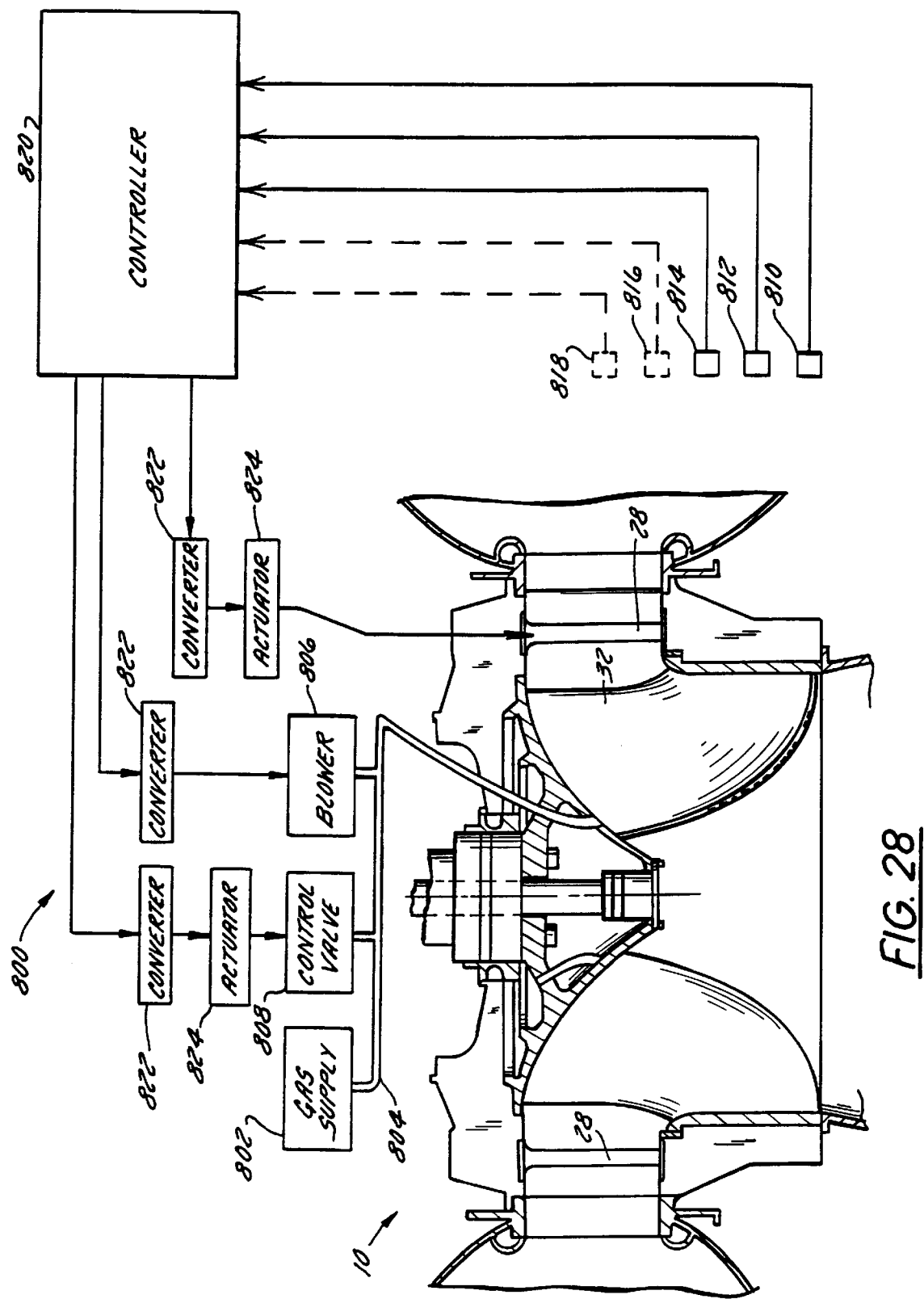
FIG. 28 shows a block diagram of a closed-loop control systems associated with a turbine of the present invention.

Referring now to FIG. 28, a control system designated as 800 may advantageously be used with the various embodiments of the present invention. For purposes of illustration, however, control system 800 will be shown and described in combination with installation 10. Gas passages in blades 32 are connected to a gas supply 802 through a gas supply passageway 804. Preferably, a compressor or high volume blower 806 is provided to facilitate gas flow through gas supply passageway 804, and a control valve 808 is provided for limiting the gas flow therethrough.

Control system 800 includes a plurality of sensors 810–818 designed to measure turbine speed, power output, head water elevation, tail water elevation, head losses, water temperature, and dissolved oxygen level in the head and tail water, among others. The electric signals generated by sensors 810–818 are sent to a controller 820, preferably via signal conditioning circuits (not shown). Controller 820 also receives an electrical signal generated by sensor 812 which is representative of the position of wicket gate 28 and blade position in a Kaplan turbine. Controller 820 preferable includes a digital-based processor and required analog to digital conversion and signal scaling circuits.

The information provided by the various sensors is used in control algorithms allowing controller 820 to compute and generate various control signals, as required, for controlling the amount of oxygen containing gas flowing through passageway 804 to enhance the dissolved oxygen level of water passing through turbine 10, without significantly compromising the efficiency of operation. To that end, the control signals generated by controller 820 are fed to a plurality of signal converters generally designated as 822. The signal from each signal converter 822 is sent in the appropriate form to an associated actuator 824 driving control valve 808, or to blower 806.

Although a variety of embodiments have been particularly described, it should be understood that the above description is of preferred exemplary embodiments of the present invention, and that the invention is not limited to the specific forms described. For example, gas supply passageway configurations and locations need not be of the kind described herein. In addition, controllers of the type associated with the described gas supply means do not need to be of the digital processor-based type. Such other constructions are, nevertheless, considered to be within the scope of this invention. Accordingly, these and other substitutions, modifications, changes and omissions may be made in the design and arrangement of the elements and in their method of operation as disclosed herein without departing from the scope of the appended claims.

What is claimed is:

1. A hydraulic turbine installation of the type including features to increase the dissolved oxygen level in water flowing through the turbine, the installation comprising:

a water passageway for containing turbine components and extending from an upper elevation source of water to a lower elevation discharge region;

a turbine runner disposed in the passageway so that water flowing therethrough impinges on the runner, the runner having a hub and a plurality of blades extending from the hub at circumferentially spaced intervals, each blade being defined by a pressure surface, an oppositely facing suction surface, a leading edge and an spaced apart trailing edge, at least one of the blades having an integrally formed gas passage extending from at least one gas inlet aperture in the hub to the trailing edge;

an oxygen containing gas source connected to the at least one gas inlet aperture in the hub for supplying a flow of oxygen containing gas to the at least one of the blades; and an electrical control system for controlling the flow of gas to thereby regulate the dissolved oxygen level in the water.

2. The hydraulic turbine installation of claim 1, wherein the gas source is connected to the at least one gas inlet aperture by at least one gas supply passageway and a blower is provided for assisting the flow of gas through the at least one passageway, and wherein the control system regulates the blower to control the flow of gas to the at least one inlet aperture.

3. The hydraulic turbine installation of claim 2, wherein the gas source is connected to the at least one gas inlet aperture by at least one gas supply passageway including a control valve, and wherein the control system regulates the valve to control the flow of gas to the at least one inlet aperture.

4. The hydraulic turbine installation of claim 3, wherein the control system includes:

a plurality of sensors selectively generating electrical signals indicative of at least the dissolved oxygen level in the water;

an electrical controller for receiving and processing the electrical signals from the sensors and for generating control signals; and an actuator coupled to the control valve and responsive to the control signals to regulate the flow of gas.

5. The hydraulic turbine installation of claim 4, wherein the controller is a digital-based processor capable of generating digital control signals, and wherein the control system further includes a digital-to-analog converter for converting the digital control signals to analog control signals.

6. The hydraulic turbine installation of claim 4, wherein the sensors further selectively generate signals indicative of at least one of turbine speed, power output, blade position, water temperature, head water elevation, tail water elevation, and head losses.

7. The hydraulic turbine installation of claim 1, wherein the runner is a Francis type runner having a crown, a band substantially concentric with the crown, and the plurality of blades extending between the crown and the band at spaced intervals along the crown, and wherein the at least one gas supply passageway and the at least one gas inlet aperture comprise one gas supply passageway and one gas inlet aperture associated with the at least one blade.

8. The hydraulic turbine installation of claim 1, wherein the runner is a Kaplan type runner in which the plurality of blades are variable pitch blades, and wherein the at least one gas supply passageway and the at least one gas inlet aperture comprise a set of gas supply passageways and a set of gas inlet apertures associated with the at least one blade, and wherein one or more of the gas admission apertures of the set are brought into fluid communication with the integral gas passage in the at least one blade based on the pitch thereof.

9. A hydraulic turbine installation of the type including features to increase the dissolved oxygen level in water flowing through the turbine, the installation comprising:
   a water passageway for containing turbine components and extending from an upper elevation source of water to a lower elevation discharge region;
   a turbine runner disposed in the passageway so that water flowing therethrough impinges on the runner, the runner having a crown, a band substantially concentric with the crown, and a plurality of blades extending between the crown and the band at spaced intervals along the crown, each blade being defined by a pressure surface, an oppositely facing suction surface, a leading edge and an spaced apart trailing edge, at least one of the blades having an integrally formed gas passage extending from a gas inlet aperture in the crown to the trailing edge;
   means for supplying an oxygen containing gas to the gas inlet aperture; and
   an electrical control system for controlling the gas supplying means to thereby regulate the dissolved oxygen level in the water.

10. The hydraulic turbine installation of claim 9, wherein the gas supplying means includes:
   a gas supply passageway connecting the gas inlet aperture to an oxygen containing gas source; and
   a gas forcing means for assisting gas flow through the gas supply passageway.

11. The hydraulic turbine installation of claim 10, further including at least one control valve in the gas supply passageway.

12. The hydraulic turbine installation of claim 11, wherein the control system includes:
   a plurality of sensors selectively generating electrical signals indicative of at least the dissolved oxygen level in the water;
   an electrical controller for receiving and processing the electrical signals from the sensors and for generating control signals; and
   means for operating the at least one control valve responsive to the control signals to regulate the gas flowing through the gas supply passageway.

13. The hydraulic turbine installation of claim 12, wherein the controller is a digital-based processor capable of generating digital control signals, and wherein the control system further includes a digital-to-analog converter for converting the digital control signals to analog control signals.

14. The hydraulic turbine installation of claim 12, wherein the sensors further selectively generate signals indicative of at least one of turbine speed, power output, head water elevation, tail water elevation, water temperature and head losses.

15. The hydraulic turbine installation of claim 12, wherein the sensors further selectively generate signals indicative of at least one of wicket gate position and blade position.

16. A method for increasing the dissolved oxygen level in water flowing through a hydraulic turbine installation, the installation comprising a turbine runner disposed in a water passageway so that water flowing therethrough impinges on the runner, the runner having a hub and a plurality of blades extending from the hub at circumferentially spaced intervals, at least one of the blades having an integrally formed gas passage extending from a gas inlet aperture in the hub to a trailing edge of the at least one of the blades, the installation further comprising means for supplying oxygen containing gas to the gas inlet aperture and an electrical control system including at least one sensor for sensing dissolved oxygen in water and for controlling the gas supplying means, the method comprising the steps of:
   supplying a flow of oxygen containing gas to the gas inlet aperture;
   sensing a level of dissolved oxygen in the water flowing through the water passageway; and
   regulating by means of the electrical control system the flow of oxygen containing gas based on the sensed dissolved oxygen levels to regulate the dissolved oxygen level in the water.

17. The method of claim 16, wherein the control system further includes at least one of a blower and a valve for regulating the flow of oxygen containing gas, the method further comprising the step of:
   controlling the at least one of the blower and the valve based upon the dissolved oxygen level to regulate the flow of oxygen containing gas to the gas inlet aperture.

18. The method of claim 17, wherein the control system further includes a plurality of sensors and an electrical controller, the method further comprising the steps of:
   selectively generating electrical signals from the sensors indicative of the dissolved oxygen level in the water and at least one of turbine speed, power output, blade position, water temperature, head water elevation, tail water elevation, water temperature and head losses;
   receiving and processing the electrical signals by the electrical controller and generating control signals; and
   sending the control signals to the at least one of the control valve and blower to regulate the flow of gas to the gas inlet aperture.

19. The method of claim 18, wherein the controller is a digital-based processor capable of generating digital control signals including a digital-to-analog converter, the method further comprising the step of:
   converting the digital control signals to analog control signals.

20. The method of claim 16, wherein the runner includes at least one of moveable blades and moveable wicket gates, the method further comprising the steps of:
   controlling positions of the at least one of the moveable wicket gate and the moveable blades based upon the dissolved oxygen level.

* * * * *